Aug. 16, 1960 S. LUBKIN 2,949,226

INFORMATION TRANSFER DEVICE

Filed Aug. 16, 1955

INVENTOR.
SAMUEL LUBKIN
BY S.C. Yuter
ATTORNEY.

United States Patent Office 2,949,226

Patented Aug. 16, 1960

2,949,226

INFORMATION TRANSFER DEVICE

Samuel Lubkin, Bayside, N.Y., assignor, by mesne assignments, to Curtiss-Wright Corporation, Carlstadt, N.J., a corporation of Delaware Filed Aug. 16, 1955, Ser. No. 528,769

6 Claims. (Cl. 235—61.11)

This invention relates to apparatus for detecting and interpreting information represented by perforations on a record medium, and more particularly to a high-speed reading device employing a reusable and alterable record medium.

In modern punched record machines, it is customary to record information in coded form by punching predetermined combinations of holes in transverse sections of the recording medium such that each coded combination of holes represents information. The binary system is particularly adaptable for this type of storage as a perforated position may represent either one or zero, and conversely a nonperforated position may represent either zero or one. A transverse section containing a combination of perforated and nonperforated positions may be used to denote numeric, alphabetic or control information.

The most common method of detecting the recorded information is to pass the record medium through the sensing portion of a translator unit having a plurality of mechanical feelers corresponding in number to the code employed. The feelers successively detect the coded combinations perforated in the transverse sections of the record medium and translate the coded combinations into electrical signals. The wear resulting from the pressure contact between the record medium and the mechanical feelers decreases the useful life of the record medium.

In addition when paper cards or paper tape are used as the punched record, a hole is punched in those positions where the information is to be recorded. Since this hole is permanent, the information represented by the hole is nonerasable. Thus if an error occurs in preparing the punched record, a new punched record must be prepared. When more than a few units of information are stored on the punched record, the amount of work to be done over can become considerably large.

In other instances a punched record is used many times over with only a slight variation in the information. For example, only one or two of the units of information are modified. The modification of the punched record necessitates the preparation of a new punched record. The preparation of a new punched record is both time consuming and expensive.

It is, therefore, an object of the invention to provide an improved record medium.

It is another object of the invention to provide a punched record medium having selectively alterable perforations.

It is a further object of the invention to provide an information transfer system for utilizing a selectively alterable punched record.

In accordance with one aspect of the invention, a record medium is provided which is fabricated from a sheet of a formable material, that is, a material capable of being bent and of being able to retain the bend. At predetermined locations in the record medium partially or incompletely punched or perforated areas are provided. Wherever a hole is desired, the partially punched area is pushed through forming a flap which is oriented outside the plane of the sheet. Wherever a hole is to be erased the flap is pushed back into the plane of the sheet.

In accordance with another aspect of the invention, the sheet in the form of a strip having coded combinations of perforations in transverse sections is passed over a support which is provided with grooves to accommodate the flaps. A plurality of signal sensing devices are positioned in the support in such a manner that they extend across and under a transverse section of the sheet, each signal sensing device being associated with an information position in the sheet. A signalling means is spaced above and extends across the transverse section of the sheet and is connected to a signal source.

During operation, the signalling means in response to the signal source transmits a signal via the transverse section of the sheet to the plurality of signal sensing probes. The presence of a hole at an information position in the sheet is effective to pass the transmitted signal to the associated signal sensing device while the absence of a hole and the presence of the sheet in the form of a partially punched area at an information position is effective to shield the signal sensing device from the transmitted signal. The signal sensing devices thereby detect the transmitted signal in accordance with the information recorded on the sheet.

To delete an undesired hole it is only necessary to push the flap back into the plane of the sheet. Thus, when the restored area is opposite its respective signal sensing device the device is shielded from the transmitted signal.

A system for detecting and translating information on a permanently perforated metallic tape is described in the copending application of Samuel Lubkin, Serial No. 393,105, filed November 19, 1953, and now abandoned and assigned to the same assignee.

A fuller understanding of the invention may be had from the following description taken in conjunction with the accompanying drawings wherein.

*Detailed description*

An information transfer system in accordance with one embodiment of the invention will now be described for detecting electrical signals by capacitive coupling methods. It should not be inferred that the invention is restricted to such methods since other embodiments, for example, utilizing electrical, optical, sonic or mechanical methods, are equally applicable.

Figure 1:
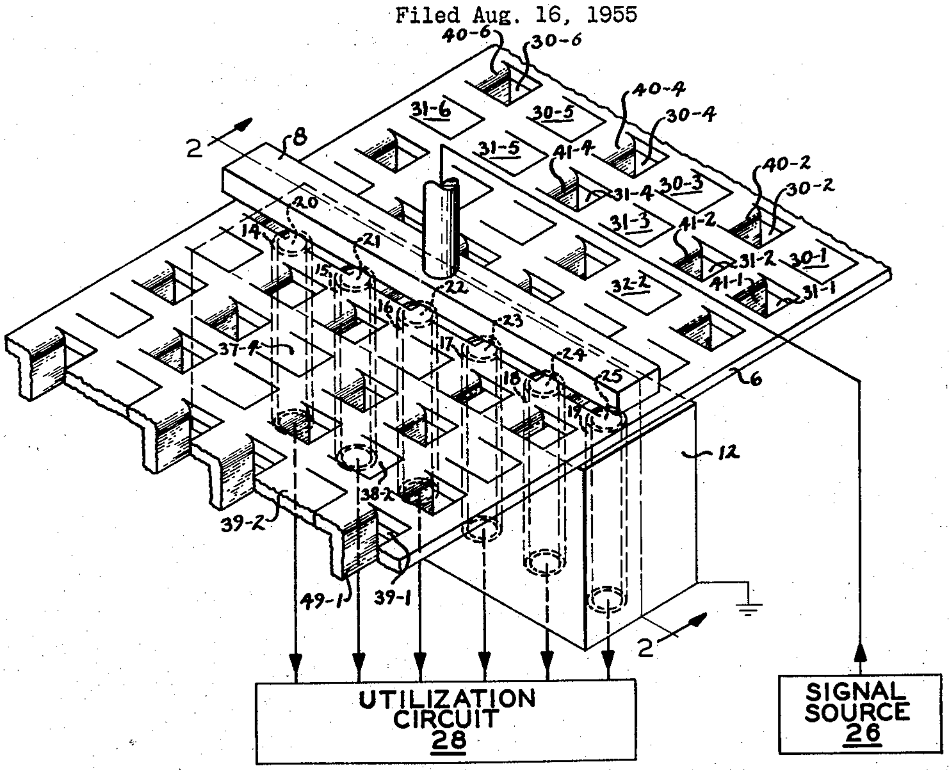
Fig. 1 is a diagram, partly in perspective and partly in block form, of an information transfer system showing the relative arrangement of the punched record medium and the sensing system in accordance with the invention.

Referring to the information transfer system shown in Fig. 1, data appears on the strip 6 in the form of a series of perforations or holes according to a selected code, which in the illustrated case is arbitrarily chosen to be a six-position code. The strip 6 which is composed of a malleable metallic material is positioned under an electrode 8 and over a metallic support 12 which is electrically grounded. Thus, the strip 6 which is in contact with the support 12 is also grounded. The support 12 has a plurality of holes passing through it to accommodate a series of units which include a plurality of nonconducting insulators 14–19 and corresponding signal sensing probes 20–25, there being a signal sensing probe for each possible perforated position in a transverse section of the strip 6.

The strip 6 includes the partially punched areas 30–1, 30–3, 30–5, 31–3, etc. and pushed through areas or holes 30–2, 30–4, 30–6, 31–1, etc., each hole having a corresponding flap such as the flaps 40–2, 40–6, 41–1, etc.

Figure 2:
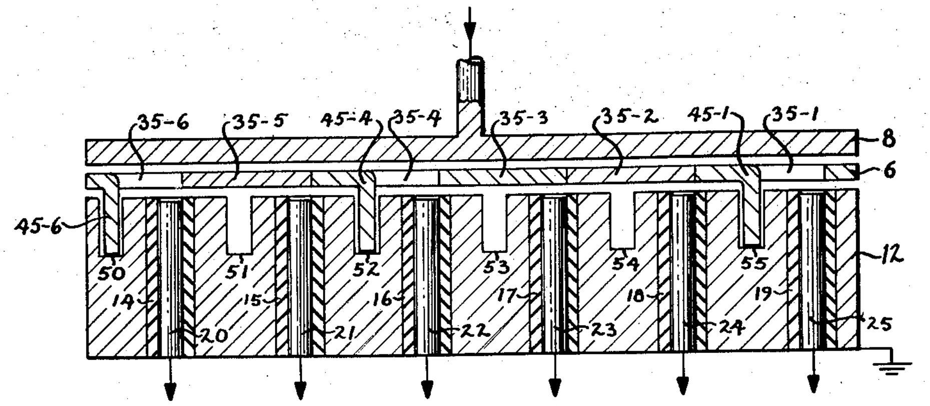
Fig. 2 is a sectional view taken on line 2—2 of Fig. 1.

The relationship of the electrode 8, the strip 6, the support 12 with the nonconducting insulators 14–19, and the corresponding signal sensing probes 20–25 is shown in cross section in Fig. 2. In addition, Fig. 2 shows the grooves 50–55 for accepting and guiding the flaps such as the flap 45–6 so that the strip 6 can travel unimpeded between the electrode 8 and the support 12.

Referring again to Fig. 1, a signal source 26 is connected to the electrode 8. The signal source may be any type of standard pulse signal source such as a pulse generator, or a standard A.-C. signal source such as a Hartley oscillator feeding a cathode follower.

Each of the signal sensing probes 20–25 is connected to a utilization circuit 28 which may be any type of circuit that utilizes signals representing numerical, alphabetical or control information, for example an electronic computer.

In operation, the strip 6 is moved between electrode 8 and support 12 by a strip feeding mechanism (not shown). A signal is transmitted from the signal source 26 to the electrode 8 and through the perforated information positions such as the hole 35–6 in the strip 6.

The signal sensing probes that are under the perforated information positions or holes in the strip 6 detect the signals passing therethrough. However, the signal sensing probes that are under nonperforated information positions such as the partially punched area 35–5 in the strip 6 are shielded from the signal being transmitted by the electrode 8 by the presence of the grounded metal of the strip 6.

To further illustrate this, the transverse section of the strip 6 under the electrode 8 contains holes over the signal sensing probes 20, 22, and 25 (see Fig. 2). Therefore, the signal sensing probles 20, 22 and 25 will detect the signal being transmitted by the electrode 8, while the grounded metal of the strip 6 will shield the signal sensing probes 21, 23 and 24 from the signal being transmitted by electrode 8.

The presence or absence of signals at the signal sensing probes may therefore designate a number, letter or order in binary form, or the signals may represent a binary digit of a larger information item recorded in each channel of the strip 6.

Although a system utilizing capacitive coupling methods has been described, it should be noted that other methods for information detection can easily be utilized in accordance with other embodiments of the invention. For example, in an optical system the signal source 26 and the electrode 8 are replaced by a source of light and the signal sensing probes 20–25 are replaced by light detecting devices such as photo cells. Further, the flaps may be detected by similar means in lieu of detecting the perforations.

Referring again to Fig. 1, the preparation of the strip 6 will be further described. The strip 6 is fabricated from a formable or malleable metallic conductor such as copper or a laminated metallic and nonmetallic material. The strip can then be partially punched similar to the method used in the "chadless" type tapes of telegraphy. Since the metal is rigid, the tabs or flaps so shaped can be positioned to remain in the plane of the strip. When the strip is to be coded with information, the appropriate flaps are pushed through and oriented to form an angle, preferably ninety degrees or one hundred and eighty degrees, with the surface of the strip 6, and substantially parallel to the direction of strip motion. See, for example, the flap 49–1 and the associated hole 39–1. Whenever a unit of information is to be erased, it is only necessary to push the flap back into the plane of the strip 6 as is shown, for example, by the area 39–2.

Thus a punched record medium capable of rapid sensing has been provided which is easily erasable and capable of rapid and selective alteration.

Although, only a few embodiments of the invention have been disclosed, it will be understood that various modifications may be made therein which are within the spirit and scope of the invention.

What is claimed is:

1. In an information detecting system having a signal transmission means, a signal detecting means, a linearly movable record medium interposed between said transmission and detecting means and having preselected recording positions, said medium having a slit formed therein at each recording position, each slit comprising the major portion of the outline of a closed figure, the unslitted portion of said figure being aligned with the direction of motion of said medium, said medium being of malleable material whereby a record may be made by deforming selected slitted portions to form rigid tabs projecting out of the plane of said medium, and means associated with at least one of the first two mentioned means for guidably receiving said tabs, said tabs being individually and selectively formable into and out of registry with said record medium.

2. In an information detecting system comprising an electrical signal source and a linearly movable record medium fabricated from a thin formable metallic electrical conductor having preselected recording positions, said medium having a slit formed therein at each recording position, each slit comprising three sides of a substantially rectangular figure, the unslitted portion of said figure being aligned with the direction of motion of said medium, said medium defining a record by deformation of selected slitted portions therein whereby rigid tabs and apertures are established, means for maintaining said record medium at a fixed electrical potential, a support having a plurality of parallel grooves in a plane parallel to the linear motion of said record medium and adapted to slidably receive said tabs, sensing means mounted in said support for detecting the information recorded in said record medium, said electrical signal source transmitting a signal via a section of said record medium to said sensing means such that the presence of an aperture in said record medium is effective to pass an electrical signal transmitted by said electrical signal source to said sensing means while the presence of slitted undeformed portions in said record medium is effective to shield said electrical signal, and each of said tabs being individually and selectively formable into and out of registry with said record medium.

3. A support for a signal sensing device comprising a block having at least one plane surface, mounting means extending from said plane surface into said block for positioning said signal sensing device in a predetermined position with respect to said plane surface, and a straight groove in said block such that the sensing device and the straight groove have a fixed predetermined orientation with respect to each other.

4. A support for a plurality of signal sensing devices comprising a block having at least one plane surface, a plurality of mounting units extending from said plane surface into said block for positioning each of said signal sensing devices at a predetermined location in said block, said mounting units being disposed along a line having a first direction in the plane of said surface, and a plurality of grooves in said block, each of said grooves being associated with one of said mounting units, each of said grooves being parallel to each other and to a line having a second direction in the plane of said surface.

5. A support for a plurality of signal sensing devices and a guide for a record medium comprising a block having at least one plane surface, a plurality of mounting units extending from said plane surface into said block, said mounting units being disposed along a line having a first direction in the plane of said surface, and a plurality of grooves in said block each of said grooves being mutually parallel and associated with one of said mounting units such that portions of said record medium are supported by said plane surface and other portions of said record medium are supported in said grooves.

6. A support for a plurality of signal sensing devices and a guide for a record medium comprising a block having at least one plane surface, a plurality of holes extending from said plane into said block for accepting said signal sensing devices, said holes being disposed along a line in the plane of the surface, and a plurality of grooves in said block each of said grooves being mutually parallel and perpendicular to the line defined by the plurality of said holes such that portions of said record medium are supported by said plane surface and other portions of said record medium are supported by said grooves.

References Cited in the file of this patent

UNITED STATES PATENTS

| | | |
|---|---|---|
| 2,315,737 | Ross | Apr. 6, 1943 |
| 2,537,778 | McCormick | Jan. 9, 1951 |
| 2,567,552 | Cronin | Sept. 11, 1951 |
| 2,608,347 | Ward | Aug. 26, 1952 |
| 2,620,978 | Carroll et al. | Dec. 9, 1952 |
| 2,640,647 | Rand | June 2, 1953 |
| 2,759,670 | Beach et al. | Aug. 21, 1956 |
| 2,762,931 | Schewe | Sept. 11, 1956 |